(12) United States Patent
Tighare et al.

(10) Patent No.: US 11,440,576 B2
(45) Date of Patent: Sep. 13, 2022

(54) AGRICULTURAL VEHICLE

(71) Applicant: MAHINDRA & MAHINDRA LIMITED, Mohali (IN)

(72) Inventors: Avinash Tighare, Mohali (IN); Vikas Singh, Mohali (IN)

(73) Assignee: MAHINDRA & MAHINDRA LIMITED, Mohali (IN)

( * ) Notice: Subject to any disclaimer, the term of this patent is extended or adjusted under 35 U.S.C. 154(b) by 0 days.

(21) Appl. No.: 17/275,252

(22) PCT Filed: Sep. 12, 2019

(86) PCT No.: PCT/IN2019/050663
§ 371 (c)(1),
(2) Date: Mar. 11, 2021

(87) PCT Pub. No.: WO2020/053890
PCT Pub. Date: Mar. 19, 2020

(65) Prior Publication Data
US 2022/0041203 A1 Feb. 10, 2022

(30) Foreign Application Priority Data
Sep. 12, 2018 (IN) .............................. 201811034488

(51) Int. Cl.
*B62D 1/14* (2006.01)
*A01B 59/06* (2006.01)
(Continued)

(52) U.S. Cl.
CPC .............. *B62D 1/14* (2013.01); *A01B 59/066* (2013.01); *B60G 3/145* (2013.01); *B60G 17/00* (2013.01);
(Continued)

(58) Field of Classification Search
CPC .......... B62D 1/14; B62D 17/00; B60G 3/145; B60G 2300/082; B60N 17/00; B60N 2/38; B60R 19/48; B60T 7/06
See application file for complete search history.

(56) References Cited

U.S. PATENT DOCUMENTS 1,793,482 A * 2/1931 Hendrickson .......... B62D 49/06
280/43
1,914,683 A * 6/1933 Clapper ................. B60G 17/00
180/21

(Continued)

FOREIGN PATENT DOCUMENTS

GB 2354160 A * 3/2001 ......... B60N 2/01508
JP 2000142049 A * 5/2000 ........... B60G 17/016
(Continued)

*Primary Examiner* — Paul N Dickson
*Assistant Examiner* — Kurtis Nielson
(74) *Attorney, Agent, or Firm* — Amster, Rothstein & Ebenstein LLP

(57) ABSTRACT

Agricultural vehicle (V) includes an operator's seat (S), a vehicular structure (C), a wheel support arrangement (100), a front bumper assembly (200), a position and draft control mechanism (30), a brake pedal linkage mechanism (500), a steering mechanism (600) and an exhaust device (700). The operator's seat S is configured to be provided in the vehicle (V) at at least one of a first seating position (Sf) corresponding to a first driving position, and a second seating position (Sr) corresponding to a second driving position, where the second seating position (Sr) is opposite to the first seating position (Sf). The vehicular structure (C) is configured to be moved between at least one lowered position in which each final drive housing (FH) is locked to vehicular structure (C) at corresponding first locking positions, and at least one raised position in which each final drive housing (FH) is locked to vehicular structure (C) at corresponding second locking positions.

14 Claims, 16 Drawing Sheets

(51) Int. Cl.
    *B60G 3/14*        (2006.01)
    *B60G 17/00*      (2006.01)
    *B60N 2/38*       (2006.01)
    *B60R 19/48*      (2006.01)
    *B60T 7/06*       (2006.01)
    *B62D 1/16*       (2006.01)
    *B62D 11/08*      (2006.01)
    *B62D 17/00*      (2006.01)

(52) U.S. Cl.
    CPC .............. *B60N 2/38* (2013.01); *B60R 19/48* (2013.01); *B60T 7/06* (2013.01); *B62D 1/16* (2013.01); *B62D 11/08* (2013.01); *B62D 17/00* (2013.01); *B60G 2200/44* (2013.01); *B60G 2300/082* (2013.01); *B60G 2500/30* (2013.01)

(56) References Cited

U.S. PATENT DOCUMENTS

| | | | | | |
|---|---|---|---|---|---|
| 3,038,545 | A | * | 6/1962 | Read | A01B 63/112 267/218 |
| 3,195,653 | A | * | 7/1965 | Carlsson | A01B 3/38 172/449 |
| 3,195,913 | A | * | 7/1965 | Hallsworth | B62D 49/0685 74/498 |
| 3,223,193 | A | * | 12/1965 | Reynolds | B62D 49/0685 180/329 |
| 3,275,084 | A | * | 9/1966 | Bunting | A01B 63/111 172/9 |
| 3,357,513 | A | * | 12/1967 | Sundberg | B62D 1/18 180/242 |
| 3,520,369 | A | * | 7/1970 | Nicholson | A01B 63/112 172/7 |
| 3,664,706 | A | * | 5/1972 | Chant | B60K 13/06 298/1 H |
| 3,749,436 | A | * | 7/1973 | Hitchcock | B62D 49/02 293/118 |
| 6,925,735 | B2 | * | 8/2005 | Hamm | B62D 49/04 37/231 |
| 8,042,817 | B2 | * | 10/2011 | Motebennur | B62D 49/0678 280/6.154 |
| 2004/0178014 | A1 | * | 9/2004 | Groves | B60K 17/043 180/337 |
| 2006/0220335 | A1 | * | 10/2006 | Damm | B62D 17/00 280/5.521 |
| 2010/0176607 | A1 | * | 7/2010 | Hardy | B60R 19/48 293/102 |
| 2013/0193710 | A1 | * | 8/2013 | Kimura | B60N 2/309 296/65.06 |
| 2020/0063621 | A1 | * | 2/2020 | Wang | F01N 13/1838 |

FOREIGN PATENT DOCUMENTS

| | | | | |
|---|---|---|---|---|
| WO | WO-9418038 A1 | * | 8/1994 | ........... B60R 25/043 |
| WO | WO-2004091947 A1 | * | 10/2004 | ....... B60G 17/01908 |
| WO | WO-2013165102 A1 | * | 11/2013 | ............. B60G 17/00 |
| WO | WO-2018052056 A1 | * | 3/2018 | ........... A01B 59/043 |
| WO | WO-2020053892 A1 | * | 3/2020 | |
| WO | WO-2020053893 A1 | * | 3/2020 | ........... A01B 63/112 |

* cited by examiner

AGRICULTURAL VEHICLE

CROSS-REFERENCE TO RELATED APPLICATIONS

This application is a U.S. national stage entry under 35 U.S.C. § 371 of PCT International Patent Application No. PCT/IN2019/050663, filed Sep. 12, 2019, which claims priority to Indian Patent Application No. 201811034488, filed Sep. 12, 2018, the contents of which are incorporated herein by reference in their entirety.

TECHNICAL FIELD

The embodiments herein relate to an agricultural vehicle.

BACKGROUND

Agricultural vehicles such as tractors and other similar vehicles are primarily used in agricultural field operations. A wide range of agricultural vehicles are available in the market. However, a single agricultural vehicle cannot meet the daily needs, or to perform multiple and complicated operations in agricultural fields. In a single crop cycle, from land preparation to post harvest, different agricultural implements or machines are required to be used along with the agricultural vehicle. These agricultural implements are either attached at a front-end or at a rear-end of the vehicle. However, these agricultural implements incur high cost and are not suitable for small scale farming due to the size of the agricultural implements.

Agricultural vehicles have an operator's seat which is fixedly provided at the rear-end of the vehicle. Agricultural field operations require the vehicle to be operated (driven) in the reverse direction, and hence the operator must turn back frequently during the reverse operation (driving) of the vehicle as the operator's seat is fixed to face forward direction. The rear visibility of the operator is limited and frequent turning of the operator during reverse operation in agricultural fields requires more effort of the operator which in turn leads to operator's fatigue resulting in reduced agricultural productivity.

Typically, agricultural vehicles include a single front axle beam which is connected to a chassis of the vehicle at a single point. With the single front axle beam, adjusting a camber angle of the front wheels of the vehicle is difficult and is one of the challenges posed to original equipment manufacturers (OEM'S) due to mounting of the single front axle beam with the chassis at the single point.

Further, agriculture has a tremendous need for tractors having various characteristics. This need has been met primarily by building a wide variety of tractors, including wheeled and tracked, of various heights and configurations. A standard height agricultural vehicle may be used to process short crops, as in case of early stage corn or the like, but difficulties arise while processing taller crops, such as mature corn, that are taller than the ground clearance of a standard vehicle. For such crops, high clearance vehicles may be used. Though high clearance vehicles provide sufficient clearance to pass over the top of taller crops, they suffer from various limitations. For example, high clearance vehicles, having crop clearance of seventy inches or more, may have an overall height that exceeds highway height restrictions, thereby making the transport of such vehicles to and from the field difficult. Further, public highways often restrict the height of a load to twelve feet or less which may be exceeded when a high clearance vehicle is placed on a transport trailer. Thus, needs to be lowered to an acceptable transport height, which is done either by deflating the tires or entirely removing the wheels.

Furthermore, the conventional tractors are not appropriate for few agricultural operations and for small agricultural fields and geographical locations such as hilly areas. Such agricultural operations, small agricultural fields and such geographical locations are mechanized either by hand tool, walk behind tractors or tillers. Existing standard agricultural vehicles have fixed characteristics and dimensions (for ex. ground clearance, seating position) and if the operator aims to change the standard characteristics of the tractor for specific requirement, the operator has to either go for a permanent change in characteristics and dimensions of the tractor or needs to choose different vehicle with required characteristics.

Therefore, there exists a need for an agricultural vehicle, which obviates the aforementioned drawbacks. Further, there exists a need for a compact agricultural vehicle which can used in small agricultural fields, hilly areas, and in any geographical location.

OBJECTS

The principal object of an embodiment of this invention is to provide an agricultural vehicle.

Another object of an embodiment of this invention is to provide an agricultural vehicle having a first driving position in which an operator drives and operates the vehicle from a first seating position which is at a rear-end of the vehicle, and a second driving position in which the operator drives and operates the vehicle from a second seating position which is at a front-end of the vehicle and immediately onto a front bumper assembly.

Another object of an embodiment of this invention is to provide an agricultural vehicle with a steering mechanism which is configured to be provided in at least one of a first position corresponding to a first driving position in the vehicle, and a second position corresponding to a second driving position in the vehicle.

Another object of an embodiment of this invention is to provide an agricultural vehicle with a steering mechanism which has a variable steering geometry to enable the vehicle to have variable turning radius and assists in better maneuverability of the vehicle in small agricultural fields.

Another object of an embodiment of this invention is to provide an agricultural vehicle which attaches and operates both pull and push type agricultural implements.

Another object of an embodiment of this invention is to provide a compact agricultural vehicle which can used in small agricultural fields, hilly areas, and in any geographical location.

Another object of an embodiment of this invention is to provide an agricultural vehicle with a wheel alignment angle adjusting mechanism which is configured to alter the position of corresponding axle beams of the vehicle to change an alignment angle of corresponding wheels of the vehicle.

Another object of an embodiment of this invention is to provide an agricultural vehicle with a front bumper assembly which is removably connected to a vehicular structure at at least one of a first position and a second position, where the front bumper assembly is adapted to removably receive an operator's seat at the second position.

Another object of an embodiment of this invention is to provide an agricultural vehicle with adjustable ground clearance.

Another object of an embodiment of this invention is to provide an agricultural vehicle with a position and draft control mechanism which is used to control the position (raising and lowering) of the agricultural implement, and to vary the draft of the agricultural implement, and to dampen a shock load received by the agricultural implement.

Another object of an embodiment of this invention is to provide an agricultural vehicle with a brake pedal linkage mechanism which works in a same manner for both first driving position and second driving position in the vehicle.

Another object of an embodiment of this invention is to provide an agricultural vehicle with an exhaust device which is configured to alter the direction of emission of engine exhaust gases away from an operator's seat in accordance to at least one of a first driving position and a second driving position in the vehicle.

These and other objects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments of the invention are illustrated in the accompanying drawings, throughout which like reference letters indicate corresponding parts in the various figures. The embodiments herein will be better understood from the following description with reference to the drawings, in which.

DETAILED DESCRIPTION

Figure 1:
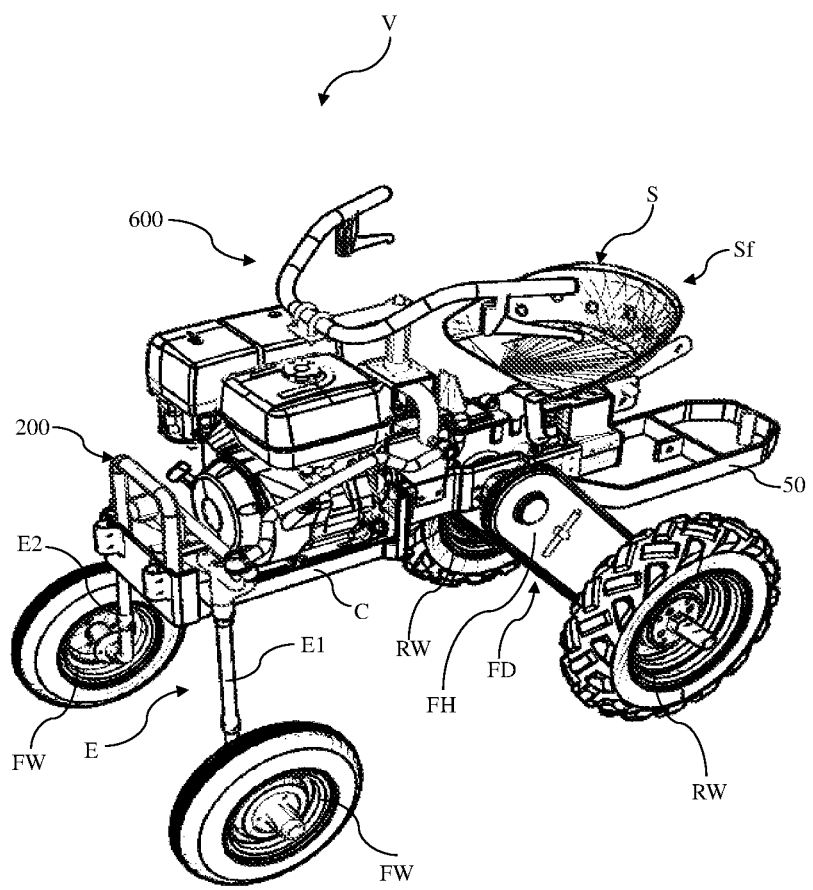
FIG. 1 depicts a perspective view of an agricultural vehicle, where a vehicular structure is at a raised position, an operator seat at a first seating position and a steering mechanism in a first position corresponding to a first driving position in the vehicle, according to an embodiment of the invention as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an agricultural vehicle. Referring now to the drawings, and more particularly to FIGS. 1 through 16, where similar reference characters denote corresponding features consistently throughout the figures, there are shown embodiments.

Figure 2:
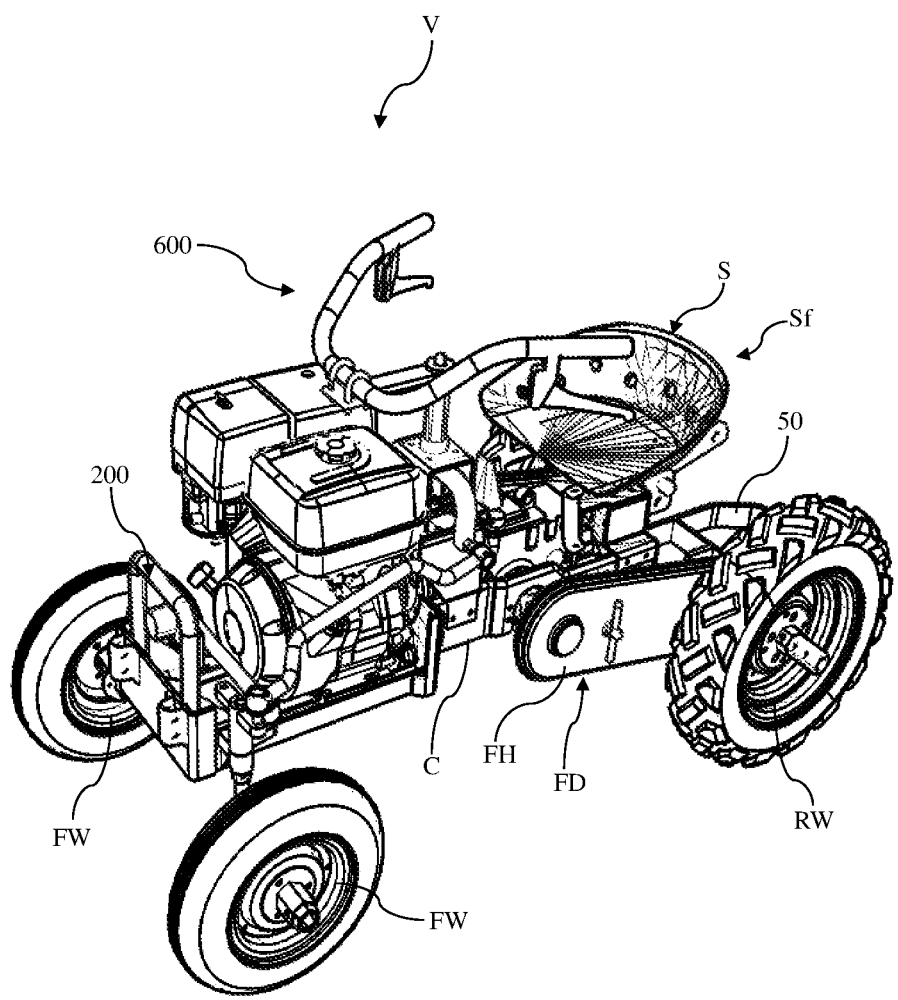
FIG. 2 depicts a perspective view of the agricultural vehicle, where the vehicular structure is in a lowered position, the operator seat at the first seating position and the steering mechanism in the first position corresponding to the first driving position in the vehicle, according to an embodiment of the invention as disclosed herein.
Figure 3:
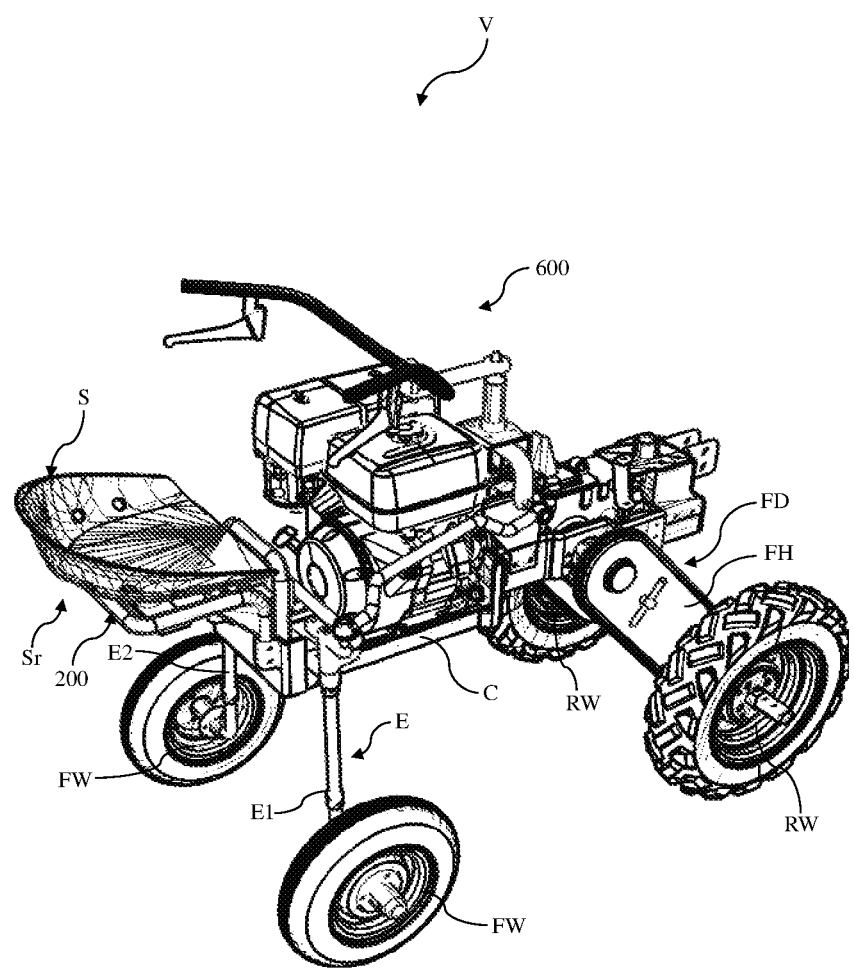
FIG. 3 depicts a perspective view of an agricultural vehicle, where the vehicular structure is at the raised position, the operator seat at a second seating position and the steering mechanism in a second position corresponding to a second driving position in the vehicle, according to an embodiment of the invention as disclosed herein.
Figure 4:
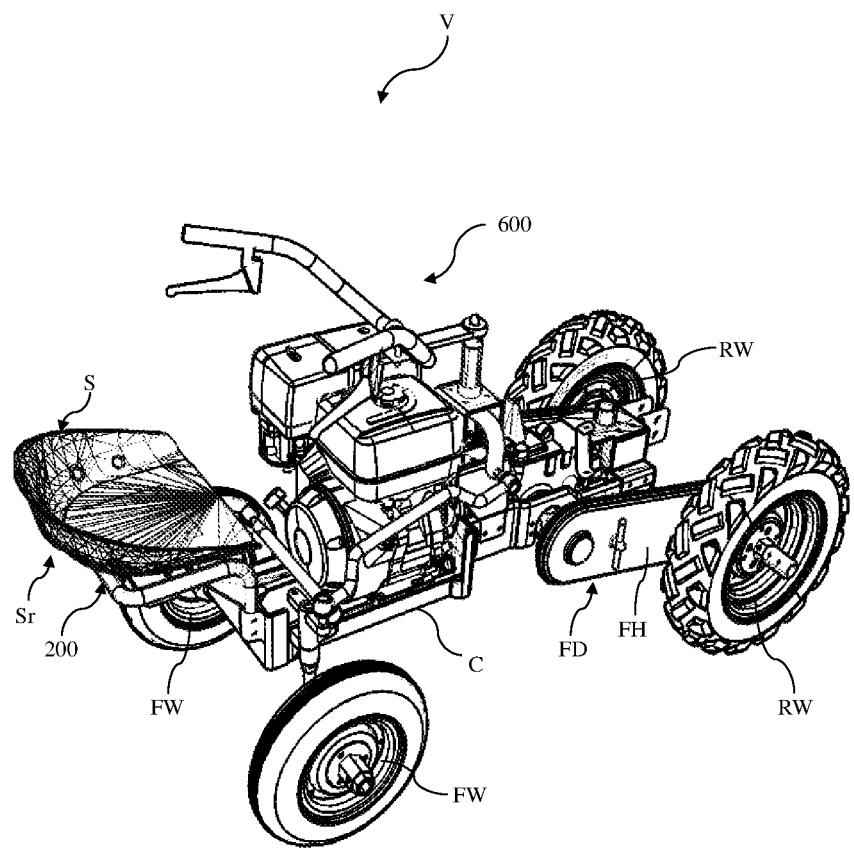
FIG. 4 depicts a perspective view of the agricultural vehicle, where the vehicular structure is in the lowered position, the operator seat at the second seating position and the steering mechanism in the second position corresponding to the second driving position in the vehicle, according to an embodiment of the invention as disclosed herein.
Figure 5:
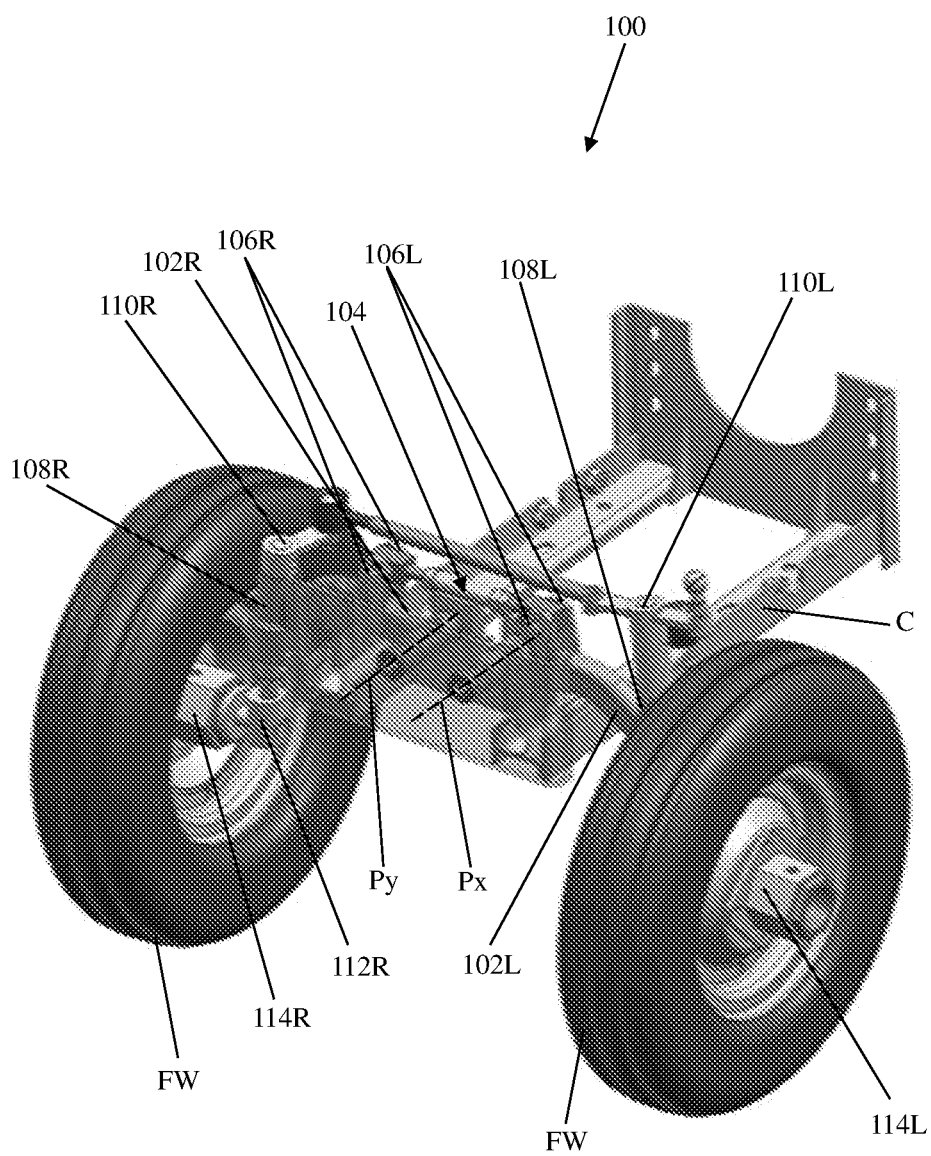
FIG. 5 depicts a perspective view of a front wheel support arrangement of the vehicle, according to an embodiment of the invention as disclosed herein.
Figure 6:
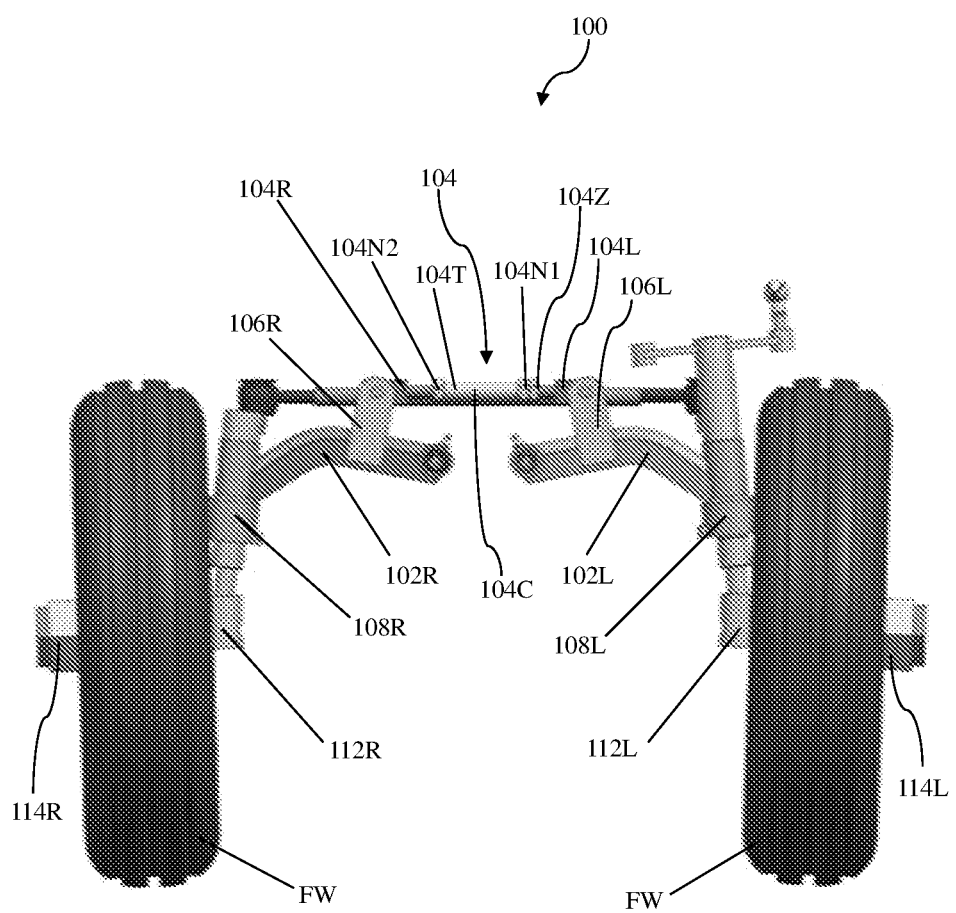
FIG. 6 depicts a front view of the front wheel support arrangement, according to an embodiment of the invention as disclosed herein.
Figure 8:
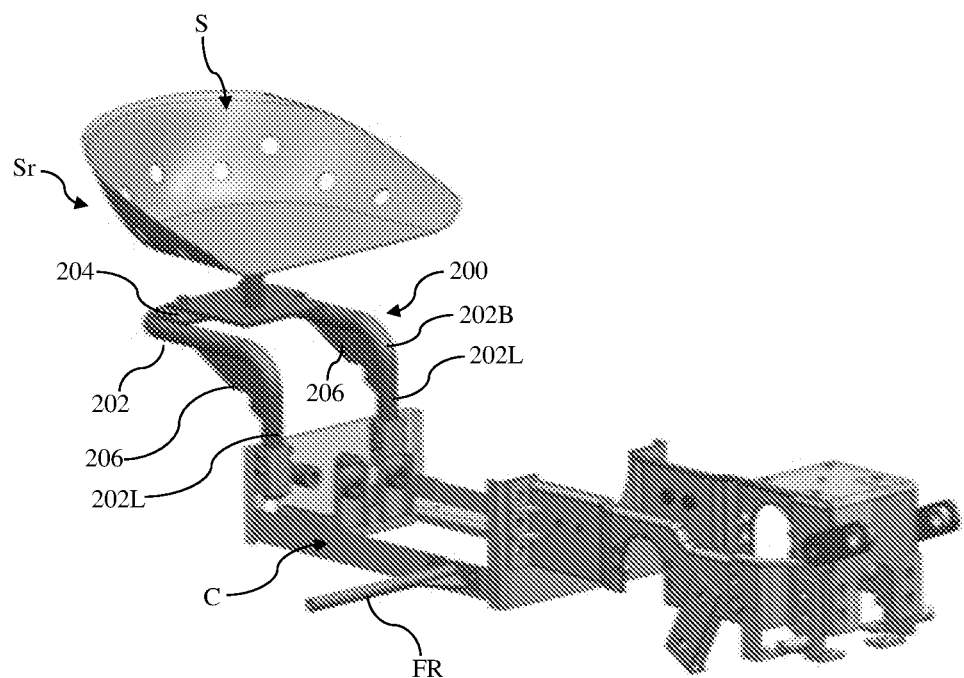
FIG. 8 depicts a perspective view of the front bumper assembly at a second position and the operator seat at the second seating position in the vehicle, according to an embodiment of the invention as disclosed herein.
Figure 9:
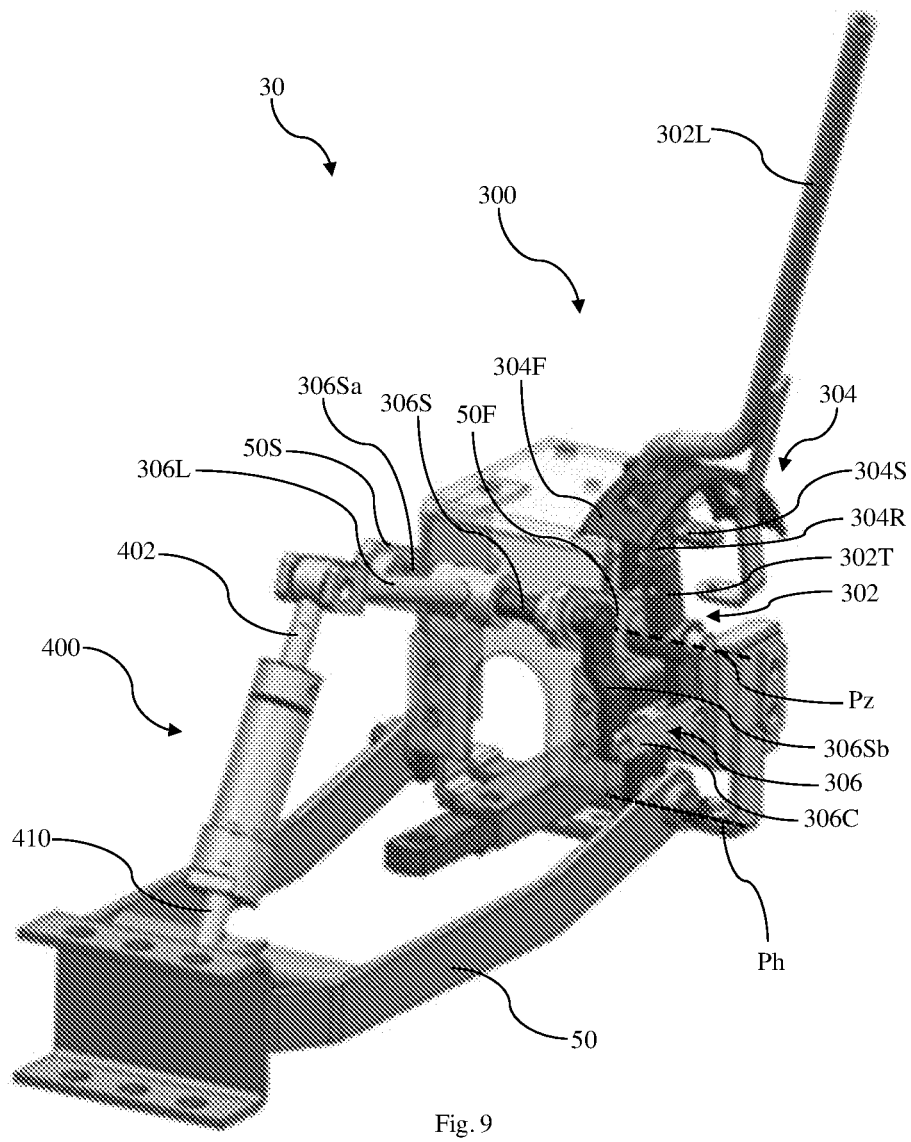
FIG. 9 depicts a perspective view of a position and draft control mechanism of the vehicle, according to an embodiment of the invention as disclosed herein.
Figure 13:
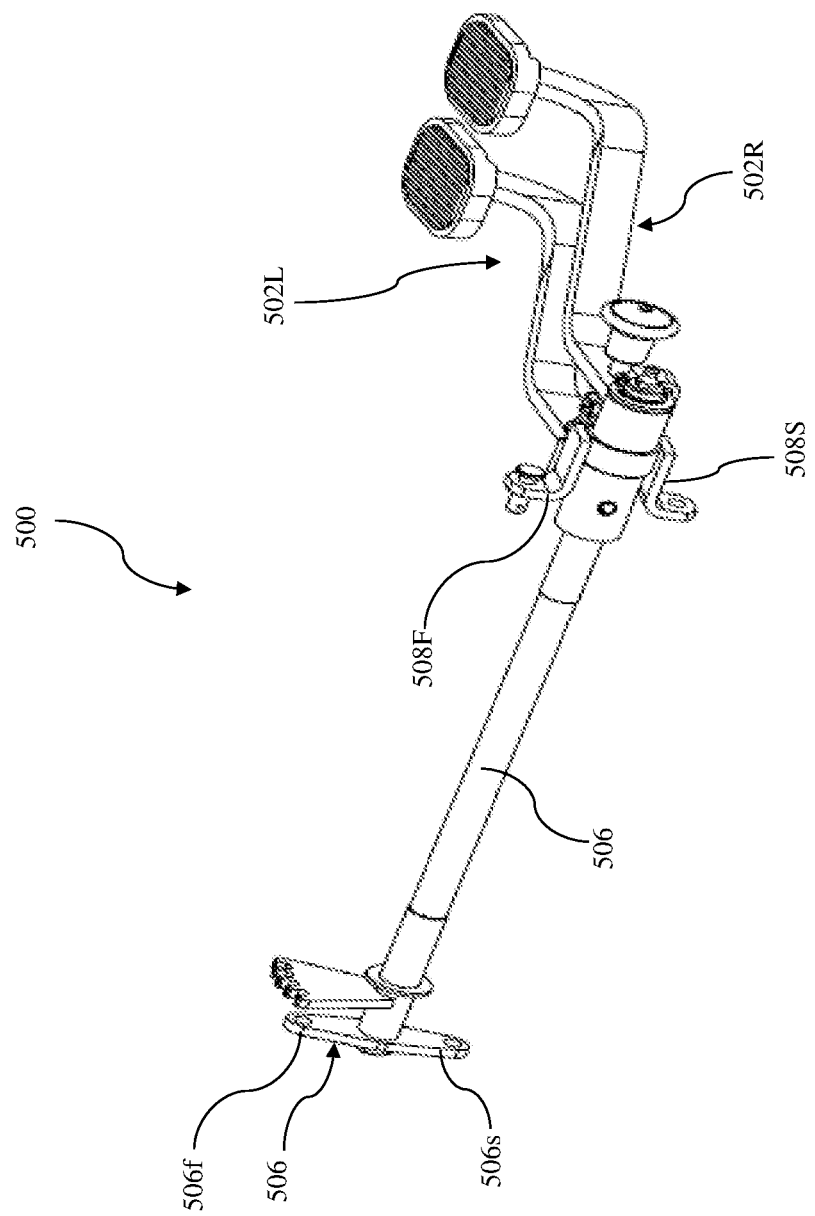
FIG. 13 depicts a perspective view of a portion of a brake pedal linkage mechanism of the vehicle, according to an embodiment of the invention as disclosed herein.
Figure 14:
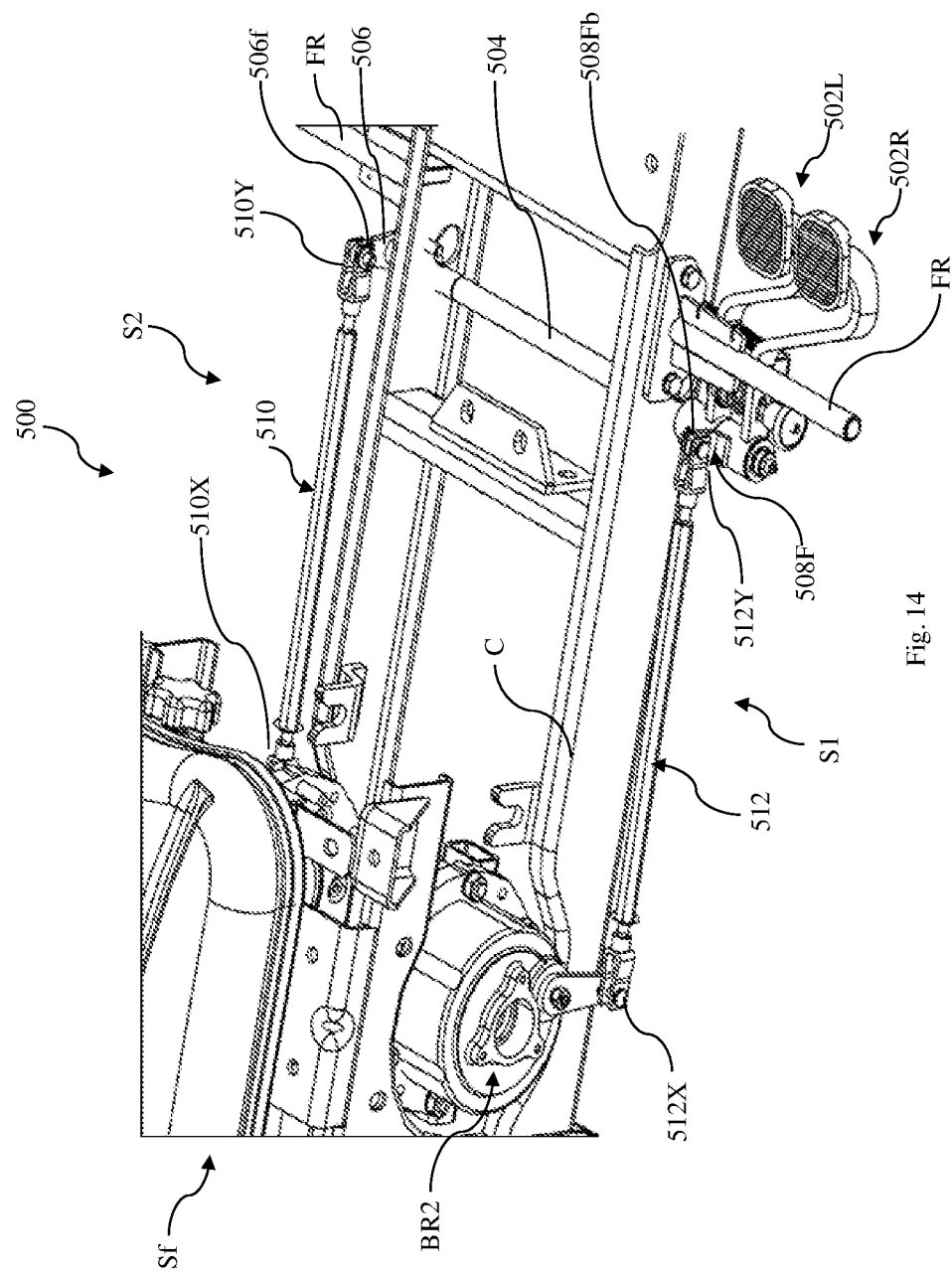
FIG. 14 depicts a perspective view of the brake pedal linkage mechanism configured to be provided in a first position corresponding to the first driving position in the vehicle, according to an embodiment of the invention as disclosed herein.
Figure 15:
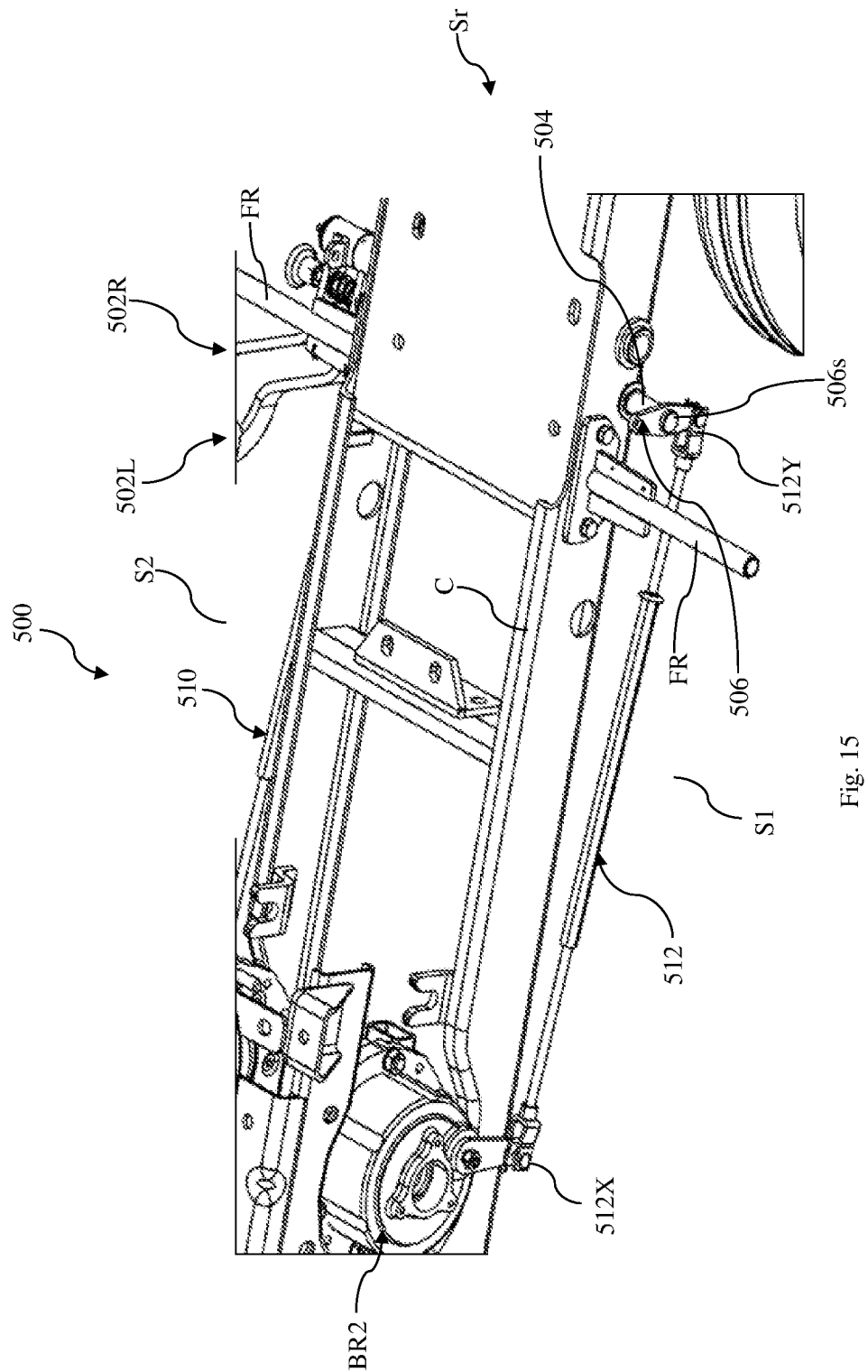
FIG. 15 depicts a perspective view of the brake pedal linkage mechanism configured to be provided in a second position corresponding to the second driving position in the vehicle, according to an embodiment of the invention as disclosed herein.
Figure 16:
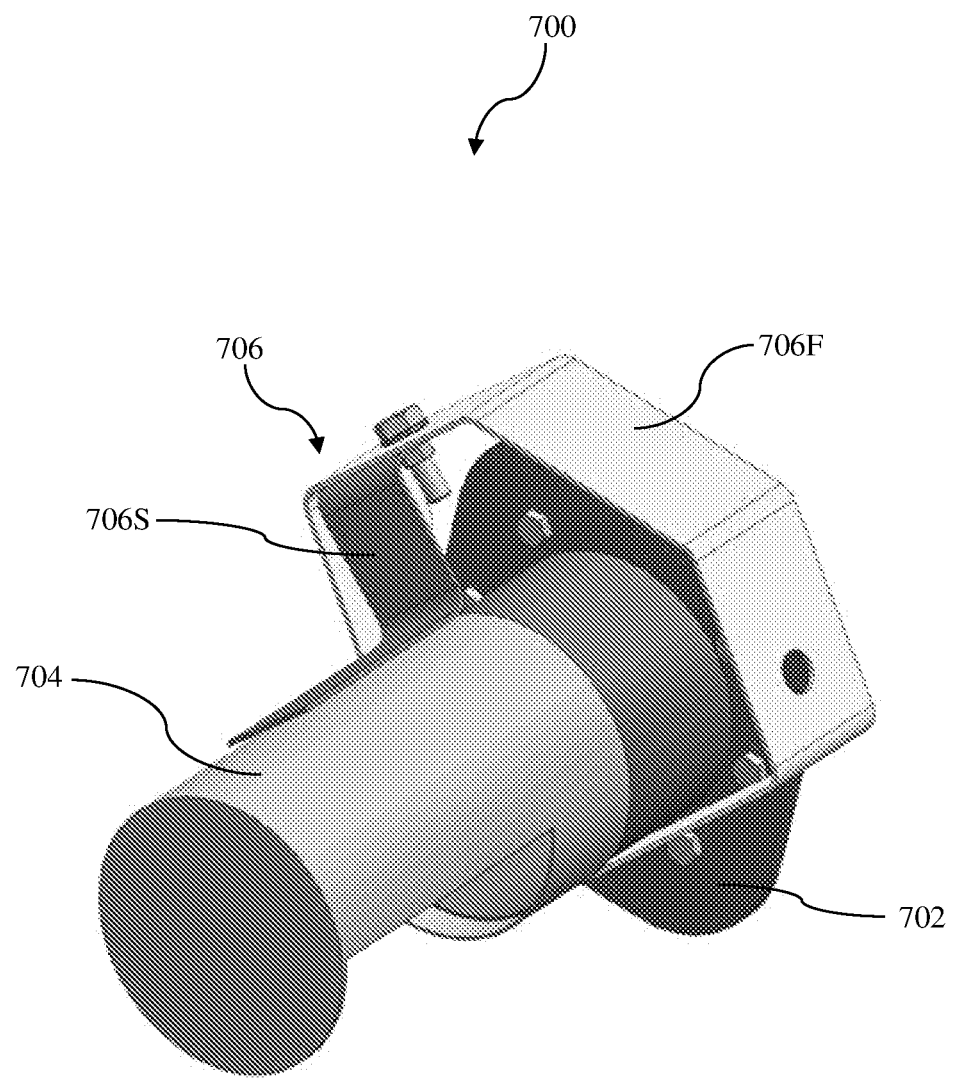
FIG. 16 depicts a perspective view of an exhaust device of the vehicle, according to an embodiment of the invention as disclosed herein.

FIG. 1 depicts a perspective view of an agricultural vehicle V, where a vehicular structure C is at a raised position, an operator seat S at a first seating position Sf and a steering mechanism 600 in a first position corresponding to a first driving position in the vehicle, according to an embodiment of the invention as disclosed herein. In an embodiment, the agricultural vehicle V (hereinafter called as vehicle V) includes an operator's seat S (as shown in FIG. 1 to FIG. 4, FIG. 7, FIG. 8, FIG. 11 and FIG. 12), a pair of final drive assemblies FD (only one of which is shown in FIG. 1 to FIG. 4), a vehicular structure C (as shown in FIG. 1 to FIG. 5, FIG. 7, FIG. 8, FIG. 11, FIG. 12, FIG. 14 and FIG. 15), an extension arrangement E (as shown in FIG. 1 and FIG. 3), a front wheel support arrangement 100 (as shown in FIG. 5 and FIG. 6), a front bumper assembly 200 (as shown in FIG. 1 to FIG. 4, FIG. 7, FIG. 8, FIG. 11 and FIG. 12), a position and draft control mechanism 30 (as shown in FIG. 9), a brake pedal linkage mechanism 500 (as shown in FIG. 13 to FIG. 15), a steering mechanism 600 (as shown in FIG. 1 to FIG. 4, FIG. 11 and FIG. 12), an exhaust device 700 (as shown in FIG. 16), at least one rear axle (not shown), an implement mounting structure 50 (as shown in FIG. 1, FIG. 2 and FIG. 9), a first support structure 50F (as shown in FIG. 9), a second support structure 50S (as shown in FIG. 9), a plurality of front wheels FW (as shown in FIG. 1 to FIG. 6, FIG. 11 and FIG. 12), a plurality of rear wheels RW (as shown in FIG. 1 to FIG. 4, FIG. 11 and FIG. 12), a plurality of foot rests FR (as shown in FIG. 7, FIG. 8, FIG. 14 and FIG. 15) and may include other standard components, mechanisms and systems as present in a standard agricultural vehicle. The agricultural vehicle V has a first driving position and a second driving position. The first driving position is defined as "an operator drives and operates the vehicle V from a first seating position Sf (as shown in fig. FIG. 1, FIG. 2, FIG. 7, FIG. 11 and FIG. 14) which is at a rear-end of the vehicle V". The second driving position is defined as "the operator drives and operates the vehicle V from a second seating position Sr (as shown in FIG. 3, FIG. 4, FIG. 8, FIG. 12 and FIG. 15) which is at a front-end of the vehicle V and immediately onto the front bumper assembly 200".

The operator's seat S is configured to be provided in the vehicle V at at least one of the first seating position Sf corresponding to the first driving position, and the second seating position Sr corresponding to the second driving position, where the second seating position Sr is opposite to the first seating position Sf.

Each final drive assembly FD includes a final drive housing FH and includes other standard components as present in a standard final drive assembly. The pair of final drive housings FH are coupled between the rear axle (not shown) and the rear wheels RW. One end of each final drive housing FH is pivoted to the rear axle (not shown). Another end of each final drive housing FH is coupled to corresponding each rear wheel RW.

The vehicular structure C is configured to be moved between at least one lowered position in which each final drive housing FH is locked to the vehicular structure C at corresponding first locking positions, and at least one raised position in which each final drive housing FH is locked to the vehicular structure C at corresponding second locking positions. The vehicular structure C is at least a chassis frame. Each final drive housing FH is locked to the vehicular structure C at corresponding each first locking point (not shown) when the vehicular structure C is at the lowered position. Each final drive housing FH is locked to the vehicular structure C at corresponding each second locking point (not shown) when the vehicular structure C is at the raised position. The extension arrangement E comprises a pair of extension members (E1 and E2) adapted to be coupled between the front wheels FW and corresponding front axle (102L and 102R) when the vehicular structure C is at the raised position. The extensions members (E1 and E2) are detached from the vehicle V when the vehicular structure C is the lowered position.

FIG. 5 depicts a perspective view of a front wheel support arrangement 100 of the vehicle V, according to an embodiment of the invention as disclosed herein. FIG. 6 depicts a front view of the front wheel support arrangement 100, according to an embodiment of the invention as disclosed herein. In an embodiment, the front wheel support arrangement 100 includes a plurality of front axle beams (102L and 102R), a wheel alignment angle adjusting mechanism 104, a plurality of linkages (106L and 106R), a plurality of kingpin tubes (108L and 108R), a plurality of kingpins (110L and 110R), a plurality of stub axles (112L and 112R), a plurality of wheel hub assemblies (114L and 114R) and may include other standard components as present in a standard vehicle wheel support arrangement. The plurality of front axle beams (102L and 102R) includes at least one left front axle beam 102L and at least one right front axle beam 102R. One end of the left front axle beam 102L is pivotably connected to the vehicular structure C about a first pivot axis Px and another end of the left front axle beam 102L is connected to the left kingpin tube 108L. One end of the right front axle beam 102R is pivotably connected to the vehicular structure C about a second pivot axis Py and another end of the right front axle beam 102R is connected to the right kingpin tube 108R. The wheel alignment angle adjusting mechanism 104 is movably connected to the front axle beams (102L and 102R) through the plurality of linkages (106L and 106R). The wheel alignment angle adjusting mechanism 104 configured to alter the position of front axle beams (102L and 102R) to change an alignment angle of front wheels FW of the vehicle V. In an embodiment, the wheel alignment angle adjusting mechanism 104 includes a rotatable center assembly 104C, a first adjustable member 104L, a second adjustable member 104R and a locking element 104Z. The first adjustable member 104L is movably connected to the left front axle beam 102L and the rotatable center assembly 104. The second adjustable member 104R is movably connected to the right front axle beam 102R and the rotatable center assembly 104. The rotatable center assembly 104C is configured to be moved to move the first adjustable member 104L and the second adjustable member 104R with respect to the rotatable center assembly 104C to alter the position of the front axle beams (102L and 102R) to change the alignment angle of front wheels FW. In another embodiment, the wheel alignment angle adjusting mechanism (104) comprises a hand operated lever mechanism (not shown) for moving rotatable center assembly (104C) to alter the position of the front axle beams (102L and 102R) to change the alignment angle of front wheels (FW). In another embodiment, the wheel alignment angle adjusting mechanism (104) comprises an electric drive mechanism (not shown) which comprises an electric motor (not shown) that drives the rotatable center assembly (104C) to move the first adjustable member (104L) and the second adjustable member (104R) with respect to the rotatable center assembly (104C) to alter the position of the front axle beams (102L and 102R) to change the alignment angle of front wheels (FW), where the rotatable center assembly (104C) is rotatably connected to the electric motor. In another embodiment, the wheel alignment angle adjusting mechanism (104) includes at least one cylinder assembly (not shown), at least one first movable assembly (not shown), at least one second movable assembly (not shown), a plurality of control valves (not shown), a controller unit (not shown), at least one control means (not shown) and a module (not shown). The cylinder assembly of the mechanism (104) utilizes at least one of pressurized fluid and compressed air as working medium for adjusting the alignment angles of the wheels (FW). The cylinder assembly comprises a cylinder (not shown) and a wall (not shown).

The cylinder having a first chamber (not shown) adapted to be provided in fluid communication with corresponding at least one control valve and a second chamber (not shown) adapted to be provided in fluid communication with corresponding at least one another control valve. The wall (not shown) adapted to be provided between the first chamber (not shown) and the second chamber (not shown) of the cylinder (not shown). The first movable assembly is movably connected to the cylinder assembly and the left front axle beam (102L). The first movable assembly (not shown) comprising a first movable member (not shown) and a second movable member (not shown). The first movable member (not shown) of the first movable assembly (not shown) is slidably connected inside the first chamber (not shown) of the cylinder of the cylinder assembly. The second movable member of the first movable assembly is movably connected to the first movable member of the first movable assembly, and movably connected to the left front axle beam 102L. The second movable assembly is movably connected to the cylinder assembly and the right front axle beam (102R). The second movable assembly comprises a first movable member (not shown) and a second movable member (not shown). The first movable member of the second movable assembly is slidably connected inside the second chamber of the cylinder of cylinder assembly. The second movable member of the second movable assembly is movably connected to the first movable member of the second movable assembly, and movably connected to the right front axle beam (102R). The plurality of control valves are provided in fluid communication with the cylinder assembly. The control means is moved to at least on of select and set at least one of a plurality of alignment angles, and accordingly the control means provides the information to the controller unit 104V. The module is adapted to at least one of receive and process the information about at least one of road and soil condition of geographic region (area), weather condition, load of the vehicle, at least one vehicle operating parameter and at least one parameter which influences tyre life and performance, and accordingly the module sends the information to the controller unit. The controller unit is provided in communication with the plurality of control valves. The controller unit is adapted to activate the plurality of control valves to regulate at least one the flow of fluid to the cylinder assembly and the flow of fluid from the cylinder assembly to move the first movable assembly and the second movable assembly with respect to the cylinder assembly to alter the position of the front axle beams (102L and 102R) to change an alignment angle of front wheels (FW) based on the information provided by at least one of at least one control means and the module to controller unit.

Figure 7:
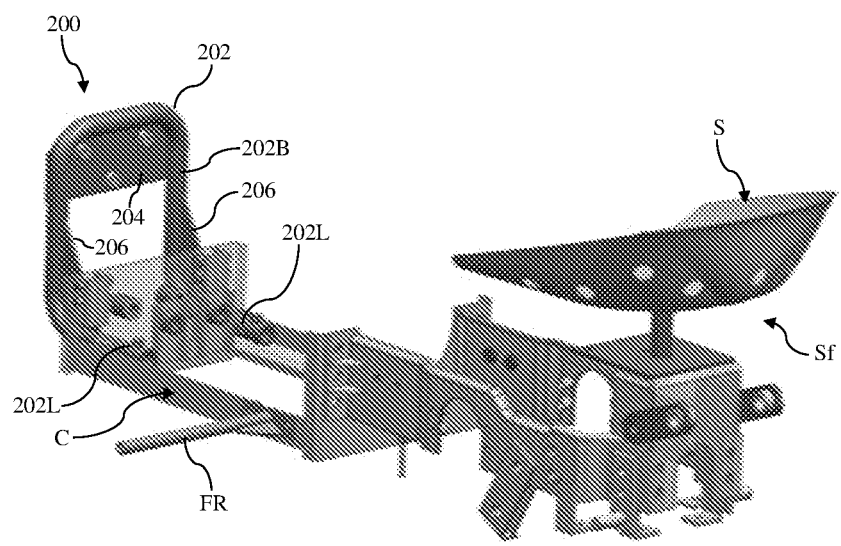
FIG. 7 depicts a perspective view of a front bumper assembly at a first position and the operator seat at the first seating position in the vehicle, according to an embodiment of the invention as disclosed herein.

FIG. 7 depicts a perspective view of a front bumper assembly 200 at a first position and the operator seat S at the first seating position Sf in the vehicle V, according to an embodiment of the invention as disclosed herein. FIG. 8 depicts a perspective view of the front bumper assembly 200 at a second position and the operator seat S at the second seating position Sr in the vehicle V, according to an embodiment of the invention as disclosed herein. The front bumper assembly 200 includes a bumper frame 202, a mounting member 204 and a plurality of reinforcement members 206. The bumper frame 202 includes a base frame 202B and a plurality of legs 202L. The front bumper assembly 200 is removably connected to the vehicular structure C at a first position in which each leg 202L of the bumper frame 202 is horizontally connected to the vehicular structure C, and a second position in which each leg 202L of bumper frame 202 is vertically connected to the vehicular structure C. The mounting member 204 of the front bumper assembly 200 is adapted to removably receive the operator's seat S when the front bumper assembly 200 is in the second position and when the vehicle V is to be operated from the second driving position. In another embodiment, the mounting member 204 of the front bumper assembly 200 is adapted to mount at least one of a ballast means and an add-on structure when the front bumper assembly 200 is in the second position. The mounting of the add-on structure onto mounting member 204 of front bumper assembly 200 at the second position enables the add-on structure to mount at least one of agricultural devices, machines, spare wheels, mechanical devices such as pumps and generator, onto the mounting member 204 of front bumper assembly 200, where the add-on structure is at least a mounting structure. The mounting of the add-on structure onto the mounting member 204 of front bumper assembly 200 at the second position enables the add-on structure to accommodate any of tools and auxiliary equipment's in the add-on structure, where the add-on structure is at least a storage compartment. The first position of front bumper assembly 200 substantially defines a L-shape configuration. The second position of front bumper assembly 200 substantially defines an inverted L-shape configuration.

FIG. 9 depicts a perspective view of a position and draft control mechanism 30 of the vehicle V, according to an embodiment of the invention as disclosed herein. The position and draft control mechanism 30 is used to control the position (raising and lowering) of an agricultural implement (hereinafter called as implement), and to vary the draft of implement, and to dampen a shock load received by the implement. The position and draft control mechanism 30 includes a position control mechanism 300 and a draft control mechanism 400. The position control mechanism 300 is used to control the position of the implement. In an embodiment, the position control mechanism 300 includes a position control lever assembly 302, a locking arrangement 304, a linkage mechanism 306, a locking member position control mechanism (not shown) and at least one resilient member 304R. The position control lever assembly 302 is pivotably connected to the first support structure 50F about a position control lever pivot axis Pz. The position control lever assembly 302 comprises a position control lever support member 302T and position control lever 302L. The position control lever support member 302T is pivotably connected to the first support structure 50F. The position control lever 302L is supported by the position control lever support member 302T. The locking arrangement 304 is used to lock the position control lever assembly 302 at at least one of a plurality of positions. A movement of the position control lever assembly 302 induces a change in the position of the implement. The locking arrangement 304 includes a first locking element 304F and a second locking element 304S. The first locking element 304 is supported by the first support structure 50F. The first locking element (not shown) has a first portion (not shown) defining a slot (not shown), and a plurality of locking portions (not shown) provided in the slot (not shown) at corresponding locking positions. The second locking element 304S has at least one locking portion (not shown) corresponding to the locking portion (not shown) of the first portion (not shown) of the first locking element 304. The second locking element 304S is movably engaged with the first locking element 304F and the position control lever assembly 302. The second locking element 304S is movable between an unlocked position in which the position control lever assembly 302 is unlocked from the first locking element 304F, and a locked position in which the position control lever assembly 302 is locked with the first locking element 304F at at least one of a plurality of locking positions. The locking portion (not shown) of the second locking element 304S is disengaged from corresponding at least one locking portion (not shown) of the first locking element 304F to unlock the position control lever assembly 302 from the first locking element 304F on movement of the second locking element 304S to the unlocked position. The locking portion (not shown) of the second locking element 304S is engaged with at least one of the plurality of locking portions (not shown) of the first portion (not shown) of the first locking element 304F to lock the position control lever assembly 302 to the first locking element 304F at corresponding at least one of the plurality of locking positions on movement of the second locking element 304S to the locked position. The linkage mechanism 306 is used to couple the position control lever assembly 302 with the implement mounting structure 50 through the draft control mechanism 400. The linkage mechanism 306 comprises a cross-shaft assembly 306S, a coupler 306C and a lift arm 306L. The cross-shaft assembly 306S includes cross-shaft 306Sa and a linkage element 306Sb. The cross-shaft 306Sa is movably supported between the first support structure 50F and the second support structure 50S. one end of the linkage element 306Sb is connected to the cross-shaft 306Sa and another end of the linkage element 306Sb is connected to coupler 306C. The coupler 306C is coupled between the position control lever support member 302T of the position control lever assembly 302 and the linkage element 306Sb of the cross-shaft assembly 306S. The lift arm 306L is movably connected to the cross-shaft 306Sa and coupled with the implement mounting structure 50 through the draft control mechanism 400. The locking member position control mechanism (not shown) is used to control the movement of the second locking element 304S between the unlocked position and the locked position. The locking member position control mechanism is a hand operated locking member position control mechanism which comprises a hand operated control lever (not shown) and a cable (not shown). The hand operated control lever is connected to the position control lever 302L. one end of the cable is connected to the hand operated control lever and another end of cable is connected to the second locking element 304S. The cable is adapted to move the second locking element 304S from the locked position to the unlocked position on engagement of the hand operated control lever. The resilient member 304R is loaded between the second locking element 304S and the position control lever support member 302T. The resilient member 304R is adapted to move the second locking element 304S from the unlocked position to the locked position in which the position control lever assembly 302 is locked with the first locking element 304F at at least one of the plurality of locking positions on dis-engagement of the hand operated control lever. The resilient member 304R is at least a spring. In another embodiment, the locking member position control mechanism is at least one of a telescopic arrangement, a hydraulic actuator, a pneumatic actuator, an electric solenoid with plunger and spring arrangement, a telescopic cylinder mechanism, an electric motor with an extendable and retractable shaft, a lead screw arrangement, a ball screw arrangement, an electro-hydraulic actuator system, an electro-pneumatic actuator system, an adjustable screw arrangement, a linear actuator, and a linear control mechanism.

Figure 10:
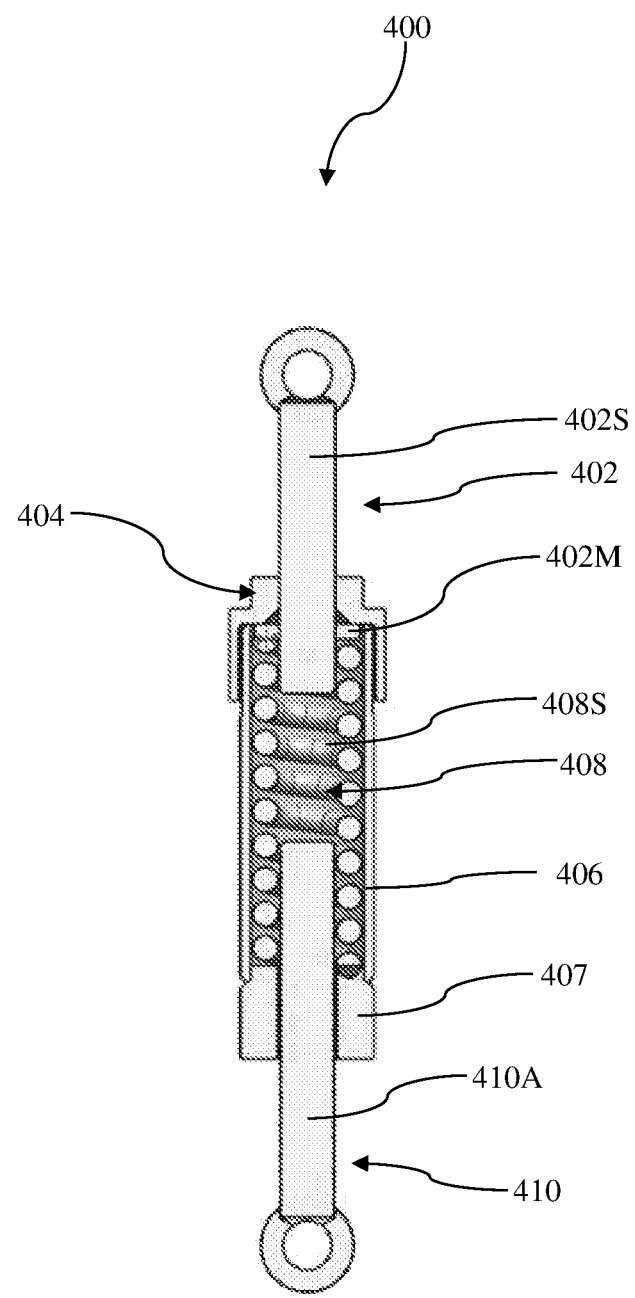
FIG. 10 depicts a cross-sectional view of a draft control mechanism of the vehicle, according to an embodiment of the invention as disclosed herein.
Figure 11:
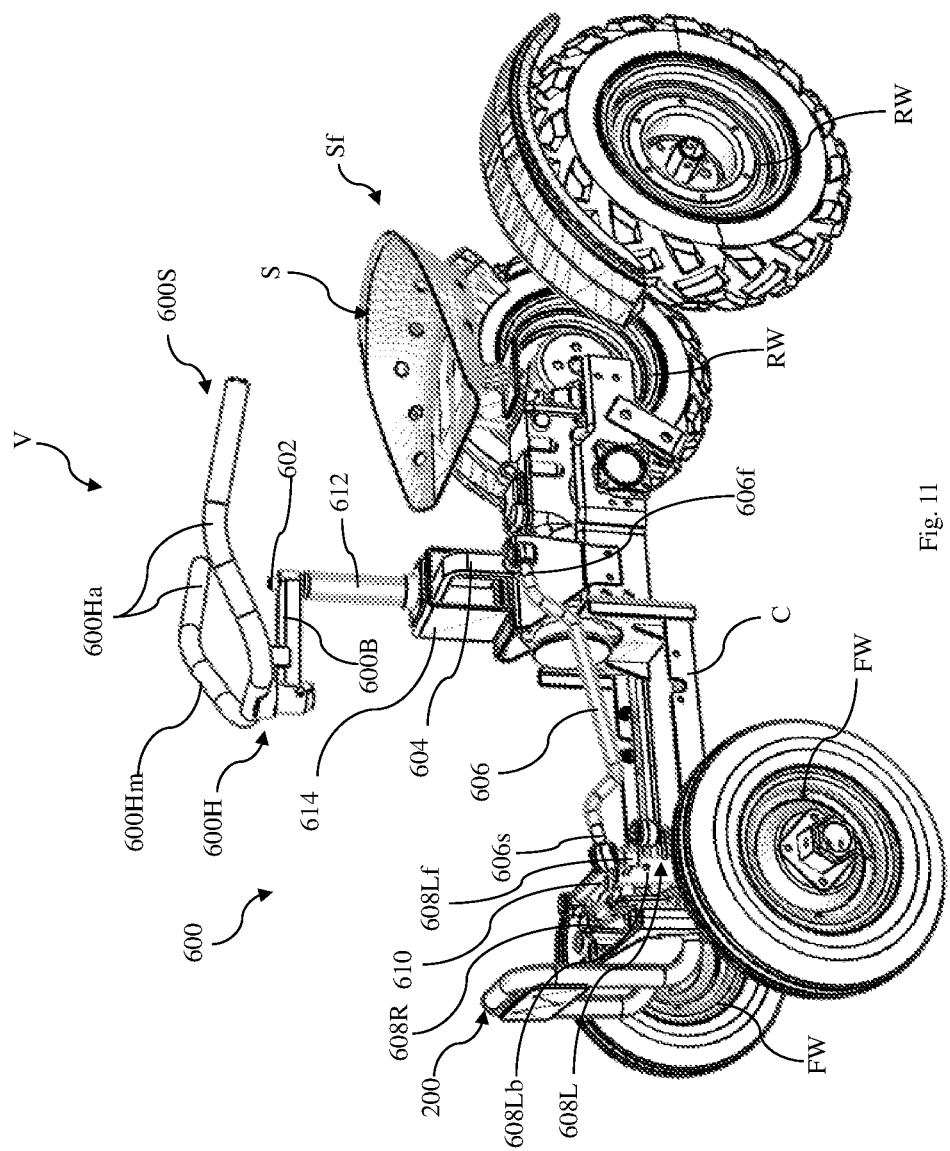
FIG. 11 depicts a perspective view of the steering mechanism in the first position corresponding to the first driving position in the vehicle, according to an embodiment of the invention as disclosed herein.
Figure 12:
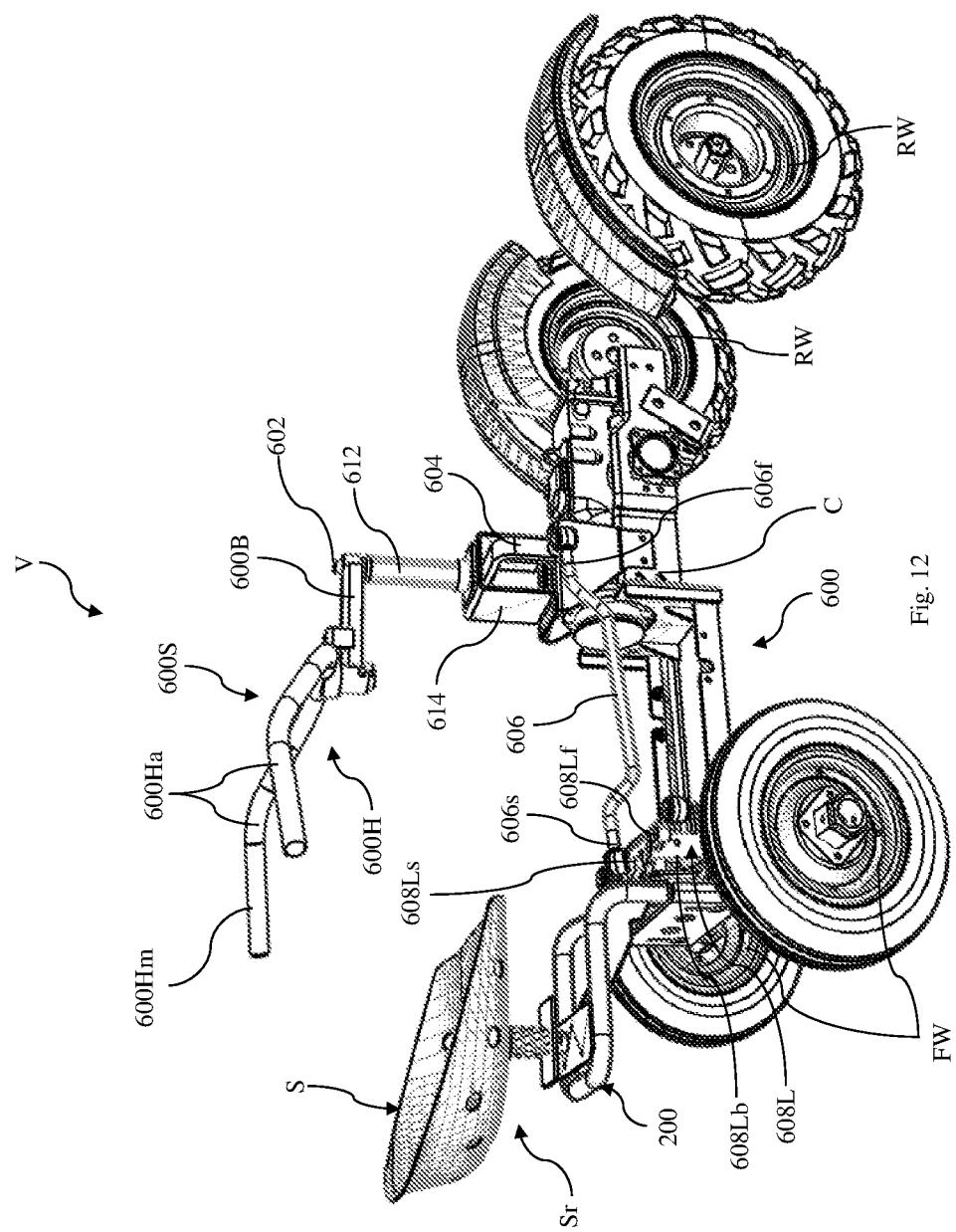
FIG. 12 depicts a perspective view of the steering mechanism in the second position corresponding to the second driving position in the vehicle, according to an embodiment of the invention as disclosed herein.

FIG. 10 depicts a cross-sectional view of a draft control mechanism 400 of the vehicle V, according to an embodiment of the invention as disclosed herein. The draft control mechanism 400 is used to vary the draft of the implement, and to dampen the shock load received by the implement. In an embodiment, the draft control mechanism 400 comprises a sliding assembly 402, a first end cover 404, at least one housing 406, a second end cover 407, at least one resilient and shock absorber arrangement 408 and an adjustable assembly 410. The draft control mechanism 400 is adapted to be coupled between the lift arm 306L of linkage mechanism 306 and the implement mounting structure 50 at a predefined angle. The implement mounting structure 50 is pivotably connected to the first support structure 50F and the second support structure 50S about a hitch pivot axis Ph (as shown in FIG. 9). The implement mounting structure 50 is at least a hitch. To vary the draft of the implement, at least one of the adjustable assembly 410 and the sliding assembly (402) is configured to be moved with respect to the housing 406 to vary the draft of the implement. The sliding assembly 402 is at least partially and slidably received inside the housing 406. For the purpose of this description and ease of understanding, the sliding assembly 402 is at least partially and slidably connected to the first end cover 404, where one end of the sliding assembly 402 is adapted to be coupled to the lift arm 306L of the linkage mechanism 306. In an embodiment, the sliding assembly 402 comprises at least one sliding element 402S and at least one support member 402M. The sliding element 402S is connected to the lift arm 306L of the linkage mechanism, and at least partially and slidably connected to the first end cover 404. The support member 402M is connected to the sliding element 402S to support corresponding end of the resilient and shock absorber arrangement 408. In another embodiment, the sliding assembly 402 is an adjustable sliding assembly (402) comprising a rotatable center member (not shown), at least one adjustable member (not shown), at least one adjustable sliding member (not shown) and at least one support member (not shown). The adjustable member of the adjustable sliding assembly (402) is coupled to the lift arm (306L) of the linkage mechanism (306) and at least partially and movably connected to the rotatable center member of the adjustable sliding assembly (402). The adjustable sliding member of the adjustable sliding assembly (402) is at least partially and movably connected to the rotatable center member of the adjustable sliding assembly (402), and at least partially and slidably connected to said first end cover (404). The support member of the adjustable sliding assembly (402) is provided inside the housing (406) and connected to the adjustable sliding member of the adjustable sliding assembly (402) to support corresponding end of the resilient and shock absorber arrangement (408). The rotatable center member of the adjustable sliding assembly (402) is configured to be moved to move the adjustable member and the adjustable sliding member of the adjustable sliding assembly (402) with respect to the rotatable center member of the adjustable sliding assembly (402) to vary the draft of the implement. In another embodiment, the sliding assembly 402 is an adjustable sliding assembly comprising a threaded tie member (not shown), at least one adjustable sliding member (not shown) and at least one support member (not shown). The threaded tie member of the adjustable sliding assembly (402) is coupled to the lift arm (306L) of the linkage mechanism (306). The adjustable sliding member of the adjustable sliding assembly (402) is at least partially and movably connected to the threaded tie member of the adjustable sliding assembly (402), and at least partially and slidably connected to the first end cover (404). The support member (not shown) is connected to the adjustable sliding member of the adjustable sliding assembly (402) to support corresponding end of the resilient and shock absorber arrangement (408). The adjustable sliding member of the adjustable sliding assembly (402) is moved with respect to the threaded tie member of the adjustable sliding assembly (402) to vary the draft of the implement. In another embodiment, the sliding assembly (402) is at least one of an adjustable and slidable telescopic arrangement, a sliding extendable and retractable arrangement, a slidable and adjustable screw arrangement, a slidable and adjustable arrangement, a slidable linear actuator, a slidable linear adjustable arrangement and a slidable telescopic cylinder arrangement. The first end cover 404 is connected to the housing 406. The housing 406 is configured to be moved with respect to at least one of the first end cover 404 and the second end cover 407 to vary the draft of the implement. The second end cover 407 is connected to housing 406 and disposed opposite to the first end cover 404. At least one of the first end cover 404 and the second end cover 407 is configured to be moved with respect to the housing 406 to vary the draft of the implement. The resilient and shock absorber arrangement 408 adapted to be provided between the sliding assembly 402, and at least one of the second end cover 407 and the adjustable assembly (410). The resilient and shock absorber arrangement 408 is adapted to dampen a shock load received by the implement. For the purpose of this description and ease of understanding, the resilient and shock absorber arrangement 408 comprises at least one resilient and shock absorber element 408S adapted to be provided inside the housing 406 and loaded between the support member 402M of the sliding assembly 402 and the second end cover 407. The adjustable assembly 410 is at least partially received inside the housing 406 and disposed opposite to the sliding assembly 402. For the purpose of this description and ease of understanding, the adjustable assembly 410 is at least partially and movably connected to the second end cover 407, where one end of the adjustable assembly 410 is adapted to be coupled to the implement mounting structure 50. For the purpose of this description and ease of understanding, the adjustable assembly 410 comprises at least one adjustable member 410A adapted to be coupled to the implement mounting structure 50, and at least partially and movably connected to the second end cover 407. The adjustable member 410A is adapted to be moved with respect to the second end cover 407 to vary the draft of the implement. In another embodiment, adjustable assembly (410) comprises a rotatable center member (not shown) and a plurality of adjustable members (not shown). The plurality of adjustable members (not shown) of the adjustable assembly (410) includes at least one first adjustable member (not shown) and at least one second adjustable member (not shown). The first adjustable member is coupled to the implement mounting structure (50) and at least partially and movably connected to the rotatable center member of the adjustable assembly (410). The second adjustable member is at least partially and movably connected to the rotatable center member of the adjustable assembly (410) and the second end cover (407). The rotatable center member of the adjustable assembly (410) is configured to be moved to move the first adjustable member and the second adjustable member of the adjustable assembly (410) with respect to the rotatable center member of the adjustable assembly (410) to vary the draft of the implement. In another embodiment, the adjustable assembly (410) comprises a threaded tie member (not shown) and at least one adjustable member (not shown). The threaded tie member of the adjustable assembly (410) is coupled to the implement mounting structure (50). The adjustable member of the adjustable assembly (410) is at least partially and movably connected to the threaded tie member of the adjustable assembly (410) and the second end cover (407). The adjustable member of the adjustable assembly (410) is configured to be moved with respect to the threaded tie member of the adjustable assembly (410) to vary the draft of the implement. In another embodiment, the adjustable assembly (410) is at least one of a telescopic adjustable arrangement, an adjustable extendable and retractable arrangement, an adjustable screw arrangement, an adjustable linear actuator, and a linear adjustable arrangement.

In an embodiment, the brake pedal linkage mechanism 500 includes a left brake pedal assembly 502L, a right brake pedal assembly 502R, a brake pedal pivot shaft 504, a left brake pedal linkage 506, a first right brake pedal linkage 508F, a second right brake pedal linkage 508S, a first brake linkage assembly 510, a second brake linkage assembly 512 and may include other standard components as present in a standard brake pedal linkage mechanism. The left brake pedal linkage 506 is operatively connected to the left brake pedal assembly 502L. The left brake pedal linkage 506 having a first portion 506$f$ and a second portion 506$s$. The first right brake pedal linkage 508F is connected to the right brake pedal assembly 502R. The second right brake pedal linkage 508S is connected to the right brake pedal assembly 502R. The first brake linkage assembly 510 having a first end 510X and a second end 510Y. The first end 510X of the first linkage assembly 510 is connected to at least one first wheel brake unit BR1. The second brake linkage assembly 512 having a first end 512X and a second end 512Y. The first end 512X of the second brake linkage assembly 512 is connected to at least one second wheel brake unit BR2. The mechanism 500 is configured to be provided in the vehicle V in a first position corresponding to the first driving position in which the first portion 506$f$ of the left brake pedal linkage 506 is connected to the second end 510Y of the first brake linkage assembly 510, the first right brake pedal linkage 508F is connected to the second end 512Y of the second brake linkage assembly 512, the brake pedal pivot shaft 504 is supported in the vehicular structure C at a first mounting position and the brake pedal assemblies (502L and 502R) are positioned adjacent to a first side S1 of the vehicle V. The mechanism 500 is configured to be provided in the vehicle V in a second position corresponding to the second driving position in which the second portion 506$s$ of the left brake pedal linkage 506 is connected to the second end 512Y of the second brake linkage assembly 512, the second right brake pedal linkage 508S is connected to the second end 510Y of first brake linkage assembly 510, the brake pedal pivot shaft 504 is supported in the vehicular structure C at a second mounting position and the brake pedal assemblies (502L and 502R) are positioned adjacent to a second side S2 of the vehicle V. The first brake linkage assembly 510 is in an extended position, and the second brake linkage assembly 512 is in an extended position when the mechanism 500 is in the second position.

The plurality of foot rests FR is removably connected to the vehicular structure C at a first position and a second position in accordance to positioning of the brake pedal assemblies (502L and 502R) at the first driving position and the second driving position. Each foot rest FR is used to provide foot rest for the operator.

In an embodiment, the steering mechanism 600 includes a steering control arrangement 600S, a steering shaft 602, a steering shaft arm 604, at least one steering linkage 606, a plurality of steering arms (608L and 608R), a steering tie member 610, a steering column 612, a steering mounting bracket 614 and may include other standard components as present in a standard steering mechanism. In an embodiment, the steering control arrangement 600S includes a steering control assembly 600H, a steering control support member 600B, a locking element (not shown) and a stopper element (not shown). The steering control assembly 600H is movably connected to the steering control support member 600B and movable between a first position corresponding to the first driving position, and a second position corresponding to the second driving position. In an embodiment, the steering control assembly 600H includes a steering control means 600Hm, a shaft (not shown) and a clamp (not shown). The steering control assembly 600H is spaced away from the steering shaft 602. The steering control means 600Hm includes a pair of arms 600Ha. The arms 600Ha of the steering control means 600Hm are positioned towards the operator's seat S which is at the first seating position Sf corresponding to the first driving position. The arms 600Ha of the steering control means 600Hm are positioned towards the operator's seat S which is at the second seating position Sr corresponding to the second driving position. The steering control means 600Hm is at least a steering handle. The clamp is used to secure the steering control means 600Hm to the shaft which is engaged with corresponding portion of the steering control support member 600B. In another embodiment, the steering control means 600Hm is directly connected to the shaft of the steering control assembly 600H. The locking element (not shown) of the steering control arrangement 600S is used to lock the steering control assembly 600H to the steering control support member 600B. The stopper element 600T of the steering control arrangement 600S is used to restrict a movement of the steering control assembly 600H when the steering control assembly 600H is moved beyond a predefined angle. The steering control support member 600B is connected to the steering control assembly 600H and the steering shaft 602. It is also within the scope of the invention to provide the steering control arrangement (600S) as a steering wheel control arrangement. The steering arm 608L has a main body 608Lb, at least one first arm 608Lf, at least one second arm 608Ls and at least one third arm (not shown). The first arm 608Lf of the steering arm 608L is adapted to outwardly extend from the main body 608Lb of the steering arm 608L along a predefined direction. The second arm 608Ls of the steering arm 608L is adapted to outwardly extend from the main body 608Lb along corresponding predefined direction, where the second arm 608Ls is opposite to the first arm 608Lf of the steering arm 608L. The third arm 608Lt of the steering arm 608 is adapted to outwardly extend from the main body 608Lb of the steering arm 608L along corresponding predefined direction. The third arm 608Lt of the steering arm 608L is adapted to be connected to corresponding another steering arm 608R through the steering tie member 610. The steering linkage 606 having a first end 606f and a second end 606s. The first end 606f of the steering linkage 606 is operatively connected to the steering shaft 602 through the steering shaft arm 604. The second end 606s of the steering linkage 606 is connected to at least one of the first arm 608Lf of the steering arm 608L in the first driving position, and the second arm 608Ls of the steering arm 608L in the second driving position. In another embodiment, the second end (606s) of the steering linkage (606) is adapted to be connected to at least one of a plurality of mounting points in the first arm (608Lf) of the steering arm (608L) in the first driving position to vary the steering geometry of the mechanism (600) to enable the vehicle V to have variable turning radius. Similarly, the second end (606s) of the steering linkage (606) is adapted to be connected to at least one of a plurality of mounting points in the second arm (608Lf) of the steering arm (608L) in the second driving position to vary the steering geometry of the steering mechanism (600 to enable the vehicle V to have variable turning radius. In another embodiment, steering arm (608L) includes a plurality of first arms (608Lf) and a plurality of second arms (608Ls), where the size of each first arm (608Lf) alters from the other first arm (608Lf), and the size of each second arm (608Ls) alters from the other second arm (608Ls). The steering geometry of the steering mechanism (600) is altered by connecting the second end (606s) of the steering linkage (606) to at least one of the plurality of first arms (608Lf) of the steering arm (608L) in the first driving position. Similarly, the steering geometry of the steering mechanism (600) is altered by connecting the second end (606s) of the steering linkage (606) to at least one of the plurality of second arms (608Lf) of the steering arm (608L) in the second driving position.

FIG. 16 depicts a perspective view of an exhaust device 700 of the vehicle V, according to an embodiment of the invention as disclosed herein. In an embodiment, the exhaust device 700 includes a first exhaust member 702, a second exhaust member 704 and a mounting arrangement 706. The first exhaust member 702 is provided in fluid communication with at least one exhaust port of an engine (not shown) of the vehicle V. The second exhaust member 704 defines an inlet (not shown) and an outlet (not shown). The inlet of the second exhaust member 704 is provided in fluid communication with the first exhaust member 702. A position of the outlet of the second exhaust member 704 is altered with respect to the first exhaust member 702 to direct the exhaust gases G away from the operator's seat S, wherein the outlet of the second exhaust member 704 is configured to be provided at at least one of a first position and a second position in which exhaust gases from the engine (not shown) is directed away from the operator's seat S which is at at least one of the first seating position Sf and the second seating position Sr respectively. The mounting arrangement 706 includes a first mounting bracket 706F and a second mounting bracket 706S. The first mounting bracket 706F is connected to the first exhaust member 702. The second mounting bracket 706S is connected to the second exhaust member 704. The second mounting bracket 706S is used to removably mount the second exhaust member 704 to the first mounting bracket 706F between the first position and the second position.

Therefore, an agricultural vehicle V is provided.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:
1. An agricultural vehicle (V) comprising:
an operator's seat (S);

a steering mechanism (600) comprising, a steering control arrangement (600S) including a steering control assembly (600H) and a steering control support member (600B) adapted to be connected to said steering control assembly (600H); and a front bumper assembly (200), wherein said operator's seat (S) is configured to be provided in the vehicle (V) at at least one of a first seating position (Sf) corresponding to a first driving position, and a second seating position (Sr) corresponding to a second driving position, where the second seating position (Sr) is opposite to the first seating position (Sf);

said steering control assembly (600H) is adapted to be movably connected to said steering control support member (600B) and movable between a first position corresponding to the first driving position, and a second position corresponding to the second driving position; and said front bumper assembly (200) is adapted to removably receive said operator's seat (S) at the second position when the vehicle (V) is to be operated from the second driving position.

2. The vehicle (V) as claimed in claim 1 comprises, a vehicular structure (C); and a pair of final drive housings (FH) adapted to be coupled between a rear axle and corresponding rear wheels RW, wherein said vehicular structure (C) is configured to be moved between at least one lowered position in which each of said final drive housings (FH) is locked to said vehicular structure (C) at corresponding first locking positions, and at least one raised position in which each of said final drive housings (FH) is locked to said vehicular structure (C) at corresponding second locking positions.

3. The vehicle (V) as claimed in claim 2, wherein said front bumper assembly (200) is adapted to be removably connected to said vehicular structure (C) at the first position and the second position.

4. The vehicle (V) as claimed in claim 1, wherein said steering mechanism (600) comprises, a steering arm (608L) having at least one first arm (608Lf) and at least one second arm (608Ls); and at least one steering linkage (606) having a first end (606f) adapted to be operatively connected to a steering shaft (602), and a second end (606s), wherein the second end (606s) of said steering linkage (606) is adapted to be connected to at least one of the first arm (608Lf) of said steering arm (608L) in the first driving position, and the second arm (608Ls) of said steering arm (608L) in the second driving position.

5. The vehicle (V) as claimed in claim 1 comprises, a plurality of front axle beams (102L and 102R) comprising at least one left front axle beam (102L) and at least one right front axle beam (102R); and a wheel alignment angle adjusting mechanism (104) adapted to be movably connected to said axle beams (102L and 102R), wherein said wheel alignment angle adjusting mechanism (104) is configured to alter the position of said axle beams (102L and 102R) to change an alignment angle of corresponding wheels (FW) of the vehicle (V).

6. The vehicle (V) as claimed in claim 1 comprises a brake pedal linkage mechanism (500), at least one left brake pedal linkage (506) adapted to be operatively connected to a left brake pedal assembly (502L), said left brake pedal linkage (506) having a first portion (506f) and a second portion (506s);

a first right brake pedal linkage (508F) adapted to be connected to a right brake pedal assembly (502R);

a second right brake pedal linkage (508S) adapted to be connected to said right brake pedal assembly (502R);

at least one first brake linkage assembly (510) having a first end (510X) adapted to be connected to at least one first wheel brake unit (BR1), and a second end (510Y); and at least one second brake linkage assembly (512) having a first end (512X) adapted to be connected to at least one second wheel brake unit (BR2), and a second end (512Y), wherein said mechanism (500) is configured to be provided in the vehicle (V) in a first position corresponding to the first driving position in which the first portion (506f) of said left brake pedal linkage (506) is connected to the second end (510Y) of said first brake linkage assembly (510) and said first right brake pedal linkage (508F) is connected to the second end (512Y) of said second brake linkage assembly (512); and said mechanism (500) is configured to be provided in the vehicle (V) in a second position corresponding to the second driving position in which the second portion (506s) of said left brake pedal linkage (506) is connected to the second end (512Y) of said second brake linkage assembly (512) and said second right brake pedal linkage (508S) is connected to the second end (510Y) of said first brake linkage assembly (510).

7. The vehicle (V) as claimed in claim 1 comprises, a position and draft control mechanism (30) comprising, a position control lever assembly (302) adapted to be pivotably connected to a first support structure (50F);

a locking arrangement (304) adapted to lock said position control lever assembly (302) at at least one of a plurality of positions; and a linkage mechanism (306) adapted to couple said position control lever assembly (302) with an implement mounting structure (50) through a draft control mechanism (400), wherein a movement of said position control lever assembly (302) induces a change in the position of an implement; and said draft control mechanism (400) is adapted to vary the draft of the implement.

8. The vehicle (V) as claimed in claim 7, wherein said draft control mechanism (400) comprises, at least one housing (406);

at least one sliding assembly (402) adapted to be at least partially and slidably received inside said housing (406); and at least one adjustable assembly (410) adapted to be at least partially received inside said housing (406) and disposed opposite to said sliding assembly (402), wherein at least one of said adjustable assembly (410) and said sliding assembly (402) is configured to be moved with respect to said housing (406) to vary the draft of the implement.

9. The vehicle (V) as claimed in claim 8, wherein said draft control mechanism (400) comprises, a first end cover (404) adapted to be connected to said housing (406);

a second end cover (407) adapted to connected to said housing (406) and disposed opposite to said first end cover (404); and
at least one resilient shock absorber arrangement (408) adapted to be provided between said sliding assembly (402) and at least one of said second end cover (407) and said adjustable assembly (410),
wherein
said resilient shock absorber arrangement (408) is adapted to dampen a shock load received by the implement.

10. The vehicle (V) as claimed in claim 1 comprises an exhaust device (700) comprising,
a first exhaust member (702) adapted to be provided in fluid communication with at least one exhaust port of an engine (EG); and
a second exhaust member (704) defining an inlet (704i) adapted to be provided in fluid communication with said first exhaust member (702), and an outlet (704p), wherein
a position of the outlet (704p) of said second exhaust member (704) is altered with respect to said first exhaust member (702) to direct the exhaust gases (G) away from said operator's seat (S).

11. An agricultural vehicle (V) comprising:
a plurality of front axle beams (102L and 102R) comprising at least one left front axle beam (102L) and at least one right front axle beam (102R);
a wheel alignment angle adjusting mechanism (104) adapted to be movably connected to said axle beams (102L and 102R);
a front bumper assembly (200); and
an operator's seat (S) configured to be provided in the vehicle (V) at at least one of a first seating position (Sf) corresponding to a first driving position, and a second seating position (Sr) corresponding to a second driving position,
wherein
said mechanism (104) is configured to alter the position of said axle beams (102L and 102R) to change an alignment angle of corresponding wheels (FW) of the vehicle (V);
said front bumper assembly (200) is adapted to be removably connected to a vehicular structure (C) at a first position and a second position; and
said second seating position (Sr) corresponding to said second driving position in which said operator's seat (S) is removably provided on said front bumper assembly (200) when said bumper assembly (200) is in the second position, where the second seating position (Sr) is opposite to the first seating position (Sf).

12. An agricultural vehicle comprising:
a vehicular structure (C);
a pair of final drive housings (FH) adapted to be coupled between a rear axle and corresponding rear wheels (RW);
a front bumper assembly (200); and
an operator's seat (S) configured to be provided in the vehicle (V) at at least one of a first seating position (Sf) corresponding to a first driving position, and a second seating position (Sr) corresponding to a second driving position,
wherein
said front bumper assembly (200) is adapted to be removably connected to said vehicular structure (C) at a first position and a second position;
said vehicular structure (C) is configured to be moved between at least one lowered position in which each of said final drive housings (FH) is locked to said vehicular structure (C) at corresponding first locking positions, and at least one raised position in which each of said final drive housings (FH) is locked to said vehicular structure (C) at corresponding second locking positions; and
said second seating position (Sr) corresponding to said second driving position in which said operator's seat (S) is removably provided on said front bumper assembly (200) when said bumper assembly (200) is in the second position, where the second seating position (Sr) is opposite to the first seating position (Sf).

13. An agricultural vehicle (V) comprising:
a vehicular structure (C);
a pair of final drive housings (FH) adapted to be coupled between a rear axle and corresponding rear wheels (RW);
an operator's seat (S); and
a steering mechanism (600) comprising, a steering control arrangement (600S) including a steering control assembly (600H) and a steering control support member (600B) adapted to be connected to said steering control assembly (600H), a steering arm (608L) having at least one first arm (608Lf) and at least one second arm (608Ls), and at least one steering linkage (606) having a first end (606f) adapted to be operatively connected to a steering shaft (602), and a second end (606s),
wherein
said operator's seat (S) is configured to be provided in the vehicle (V) at at least one of a first seating position (Sf) corresponding to a first driving position, and a second seating position (Sr) corresponding to a second driving position in the vehicle (V), where the second seating position (Sr) is opposite to the first seating position (Sf);
said steering control assembly (600H) is adapted to be movably connected to said steering control support member (600B) and movable between a first position corresponding to the first driving position, and a second position corresponding to the second driving position;
the second end (606s) of said steering linkage (606) is adapted to be connected to at least one of the first arm (608Lf) of said steering arm (608L) in the first driving position, and the second arm (608Ls) of said steering arm (608L) in the second driving position of the vehicle (V); and
said vehicular structure (C) is configured to be moved between at least one lowered position in which each of said final drive housings (FH) is locked to said vehicular structure (C) at corresponding first locking positions, and at least one raised position in which each of said final drive housings (FH) is locked to said vehicular structure (C) at corresponding second locking positions.

14. The vehicle (V) as claimed in claim 13 comprises,
a plurality of front axle beams (102L and 102R) comprising at least one left front axle beam (102L) and at least one right front axle beam (102R); and
a wheel alignment angle adjusting mechanism (104) adapted to be movably connected to said axle beams (102L and 102R),
wherein
said mechanism (104) is configured to alter the position of said axle beams (102L and 102R) to change an alignment angle of corresponding wheels (FW) of the vehicle (V).

* * * * *